(12) United States Patent
Zhao et al.

(10) Patent No.: US 8,260,614 B1
(45) Date of Patent: Sep. 4, 2012

(54) METHOD AND SYSTEM FOR EXPANDING A WORD GRAPH TO A PHONE GRAPH BASED ON A CROSS-WORD ACOUSTICAL MODEL TO IMPROVE CONTINUOUS SPEECH RECOGNITION

(75) Inventors: Qingwei Zhao, Beijing (CN); Zhiwei Lin, Singapore (SG); Yonghong Yan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2018 days.

(21) Appl. No.: 10/019,382

(22) PCT Filed: Sep. 28, 2000

(86) PCT No.: PCT/CN00/00292
§ 371 (c)(1),
(2), (4) Date: Mar. 20, 2003

(87) PCT Pub. No.: WO02/27535
PCT Pub. Date: Apr. 4, 2002

(51) Int. Cl.
*G10L 15/00* (2006.01)
(52) U.S. Cl. ............ 704/243; 704/250; 704/257
(58) Field of Classification Search .......... 704/243, 704/250, 257
See application file for complete search history.

(56) References Cited

U.S. PATENT DOCUMENTS

| | | | |
|---|---|---|---|
| 5,457,770 A | 10/1995 | Miyazawa et al. | |
| 6,456,971 B1 * | 9/2002 | Mohri et al. | 704/256.4 |
| 6,990,448 B2 * | 1/2006 | Charlesworth et al. | 704/243 |
| 7,010,408 B2 * | 3/2006 | Kitazawa et al. | 701/70 |
| 2002/0052740 A1 * | 5/2002 | Charlesworth et al. | 704/220 |
| 2006/0015339 A1 * | 1/2006 | Charlesworth et al. | 704/251 |

FOREIGN PATENT DOCUMENTS

| | | |
|---|---|---|
| CN | 1235312 A | 11/2009 |
| EP | 0750293 A2 | 12/1996 |
| WO | WO99/21168 | 4/1999 |

OTHER PUBLICATIONS

International Search Report for PCT Application PCT/CN2000/000292 Mailed Apr. 12, 2001, 3 Pages.

* cited by examiner

*Primary Examiner* — Daniel D Abebe
(74) *Attorney, Agent, or Firm* — Blakely, Sokoloff, Taylor & Zafman LLP

(57) ABSTRACT

A method and system that expands a word graph to a phone graph. An unknown speech signal is received. A word graph is generated based on an application task or based on information extracted from the unknown speech signal. The word graph is expanded into a phone graph. The unknown speech signal is recognized using the phone graph. The phone graph can be based on a cross-word acoustical model to improve continuous speech recognition. By expanding a word graph into a phone graph, the phone graph can consume less memory than a word graph and can reduce greatly the computation cost in the decoding process than that of the word graph thus improving system performance. Furthermore, continuous speech recognition error rate can be reduced by using the phone graph, which provides a more accurate graph for continuous speech recognition.

18 Claims, 10 Drawing Sheets

METHOD AND SYSTEM FOR EXPANDING A WORD GRAPH TO A PHONE GRAPH BASED ON A CROSS-WORD ACOUSTICAL MODEL TO IMPROVE CONTINUOUS SPEECH RECOGNITION

FIELD OF THE INVENTION

The present invention relates generally to speech processing and to automatic speech recognition (ASR) systems. More particularly, the present invention relates to a method and system for expanding a word graph to a phone graph based on a cross-word acoustical model to improve continuous speech recognition.

BACKGROUND OF THE INVENTION

A continuous speech recognition system recognizes a collection of continuous spoken words ("speech") into recognized phrases or sentences. A spoken word typically includes one or more phones or phonemes, which are distinct sounds of a spoken word. Thus, to recognize continuous speech, a speech recognition system must maintain relationships between the words in the continuous speech. A common way of maintaining relationships between words is using a word graph. A word graph includes a plurality of word nodes to form a net or lattice. Each word node represents a unit word and the net or lattice maintains the relationships between the unit words.

FIGS. 1A and 1B are prior art word graphs based on a within word acoustical model and a cross-word acoustical model (i.e., a model in which word is related to a word before and after). FIG. 1A is a prior art word graph 100 based on the within word acoustical model. Referring to FIG. 1A, the prior word graph 100 includes a plurality of word nodes 101 ("A") through 106 ("F") connected by edges of a lattice. The lattice maintains the relationships between words. Each word node represents one pronunciation of a word, which is typically referred to as a phonelist. Word nodes can also represent triphone lists, which are pronunciations having a right and left context. A common use of triphones is with the hidden markov models (HMM). The HMM are common models for speech recognition.

The word graph 100 can be based on a particular task, e.g., a task for describing the weather. For example, node 101 (A) can represent the word "cloudy," nodes 102 (B) and nodes 103 (C) can represent the words "very" and "partly," respectively, and nodes 104 (D), 105 (E), and 106 (F) can represent the words "yesterday," "today," and "tomorrow," respectively. Thus, for example, graph 100 can be used to recognize continuous speech having the words "very cloudy today." In this example, word graph 100 maintains the relationships between word node 101 (A) with word nodes 102 (B) through 106 (F) to recognize continuous speech.

A disadvantage of using word graph 100 based on the within word model is that it does not account for different variations in which a word can be pronounced. That is, pronunciations can vary, e.g., from person to person, from dialect to dialect, or from context to context. Thus, the word graph 100 is prone to a high speech recognition error rate.

FIG. 1B is a prior art word graph 150 based on the cross-word acoustical model. The word graph 150 based on the cross-word acoustical model is derived from the word graph 100 based on the within word acoustical model. The word graph 150 provides improved recognition accuracy than prior word graph 100 by accounting for co-articulation effects between words. Referring to FIG. 1B, word graph 150 includes a plurality of word nodes 101a ((B)A(D)) through 101f ((C)A(F)) and word nodes 102 (B) through 106 (F). The word nodes represented by word nodes 101a through 101f are copies of the word node A with varying left contexts and right contexts. For example, word node 101a provides a left context (B) and a right context (D) for the word A.

A disadvantage of using word graph 150 based on the cross-word acoustical model is that it requires multiple copies of a word node. That is, word node (A) in word graph 150, is required to account for the variations for word node (A). For example, referring to word graph 150, word node 101a ((B)A(D)) refers to one copy of node A under the left context B and right context D and word node 101f refers to another coy of the node A under the left context C and right context F. If, for example, word node (A) included 5 phones, then 6 copies of word node A would be required according to its context and 30 internal phones will be generated for word A (e.g., $BA_1$, $A_2, A_3, A_4, A_5D, BA_1, A_2, A_3, A_4, A_5E$ . . . ). As such, a word graph based on the cross-word acoustical model can consume large amounts of memory. Furthermore, computation for continuous speech recognition is increased significantly because of using such large word graphs.

BRIEF DESCRIPTION OF THE DRAWINGS

The present invention is illustrated by way of example and not intended to be limited by the figures of the accompanying drawings, in which like references indicate similar elements and in which.

DETAILED DESCRIPTION

A method and system to improve continuous speech recognition are described. An unknown speech signal is received. A word graph is generated based on an application task or based on information extracted from the unknown speech signal. The word graph is expanded into a phone graph. The unknown speech signal is recognized using the phone graph. The phone graph can be based on a cross-word acoustical model to improve continuous speech recognition.

The speech processing techniques described herein can reduce the size of graphs used for continuous speech recognition and reduce speech recognition error rate. By expanding a word graph into a phone graph, the phone graph can consume less memory space and decoding computation cost can be reduced greatly by using the phone graph in place of the word graph thus system performance can be improved. Furthermore, continuous speech recognition error rate can be reduced by using the phone graph, which provides a more accurate graph for continuous speech recognition.

Figure 2:
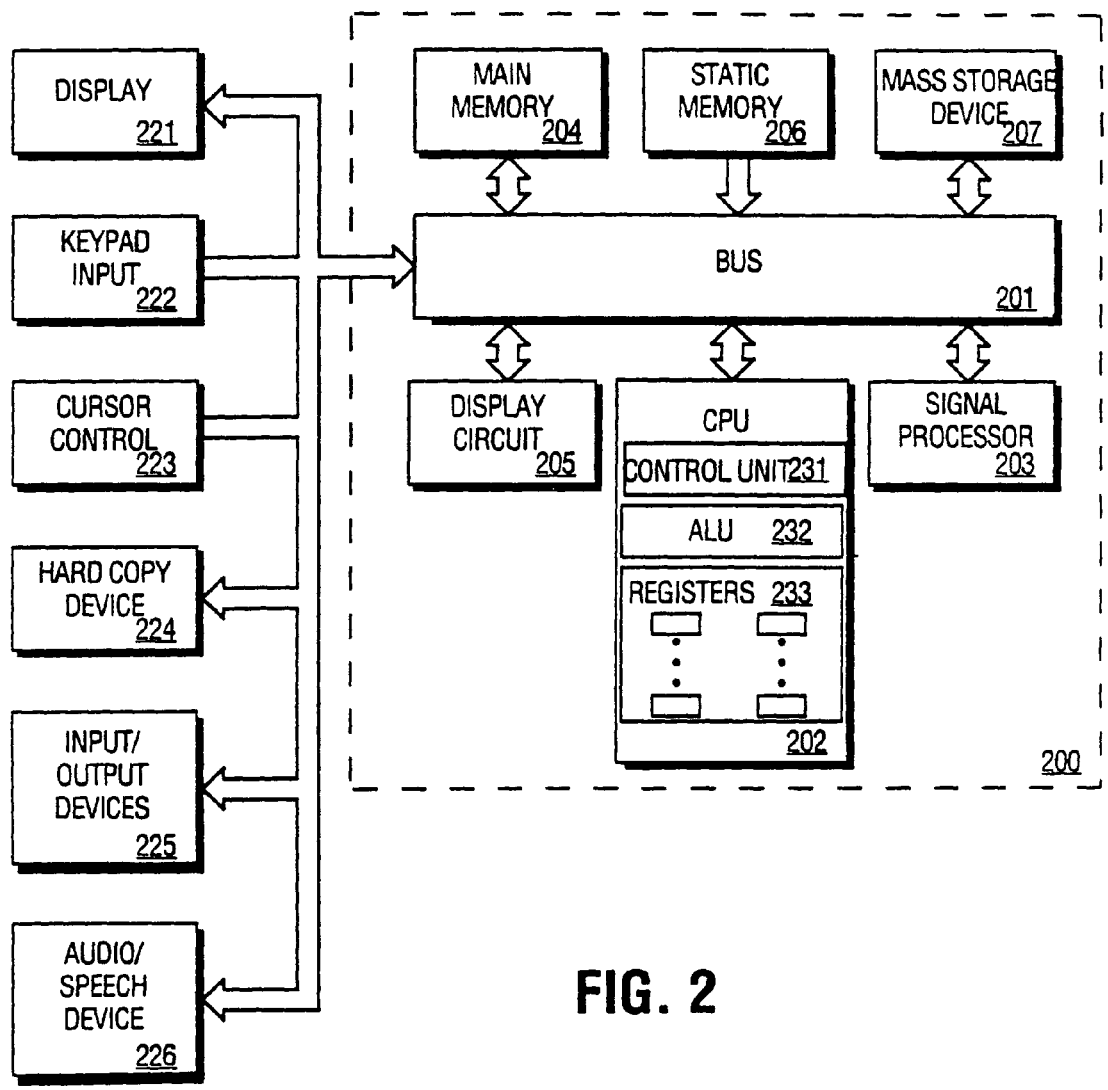
FIG. 2 is an illustration of an exemplary digital processing system in which the present invention can be practiced.

FIG. 2 is an exemplary digital processing system 200 in which the present invention can be practiced. The speech processing and speech recognition techniques described herein can be implemented and utilized within digital processing system 200, which can represent a general purpose computer, portable computer, hand-held electronic device, or other like device. The components of digital processing system 200 are exemplary in which one or more components can be omitted or added. For example, one or more memory devices can be utilized for digital processing system 200. Referring to FIG. 2, digital processing system 200 includes a central processing unit 202 and a signal processor 203 coupled to a display circuit 205, main memory 204, static memory 206, and mass storage device 207 via bus 201. Digital processing system 200 can also be coupled to a display 221, keypad input 222, cursor control 223, hard copy, device 224, input/output (I/O) devices 225, and audio/speech device 226 via bus 201.

Bus 201 is a standard system bus for communicating information and signals. CPU 202 and signal processor 203 are processing units for digital processing system 200. CPU 202 or signal processor 203 or both can be used to process information and/or signals for digital processing system 200. Signal processor 203 can be used to process speech or audio information and signals for speech processing and recognition. Alternatively, CPU 202 can be used to process speech or audio information and signals for speech processing or recognition. CPU 202 includes a control unit 231, an arithmetic logic unit (ALU) 232, and several registers 233, which are used to process information and signals. Signal processor 203 can also include similar components as CPU 202.

Main memory 204 can be, e.g., a random access memory (RAM) or some other dynamic storage device, for storing information or instructions (program code), which are used by CPU 202 or signal processor 203. For example, main memory 204 may store speech or audio information and instructions to be executed by signal processor 203 to process the speech or audio information. Main memory 204 may also store temporary variables or other intermediate information during execution of instructions by CPU 202 or signal processor 203. Static memory 206, can be, e.g., a read only memory (ROM) and/or other static storage devices, for storing information or instructions, which can also be used by CPU 202 or signal processor 203. Mass storage device 207 can be, e.g., a hard or floppy disk drive or optical disk drive, for storing information or instructions for digital processing system 200.

Display 221 can be, e.g., a cathode ray tube (CRT) or liquid crystal display (LCD). Display device 221 displays information or graphics to a user. Digital processing system 201 can interface with display 221 via display circuit 205. Keypad input 222 is a alphanumeric input device for communicating information and command selections to digital processing system 200. Cursor control 223 can be, e.g., a mouse, a trackball, or cursor direction keys, for controlling movement of an object on display 221. Hard copy device 224 can be, e.g., a laser printer, for printing information on paper, film, or some other like medium. A number of input/output devices 225 can be coupled to digital processing system 200. For example, a speaker can be coupled to digital processing system 200. Audio/speech device 226 can be, e.g., a microphone with an analog to digital converter, for capturing sounds of speech in an analog form and transforming the sounds into digital form, which can be used by signal processor 203 and/or CPU 202, for speech processing or recognition.

The speech processing techniques described herein can be implemented by executing code or instructions stored in a machine-readable medium coupled with or contained in digital processing system 200. For example, CPU 202 or signal processor 203 can execute the code or instructions stored in main memory 204 to process speech or to recognize continuous speech. The machine-readable medium can include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions can be represented by carrier wave signals, infrared signals, digital signals, and by other like signals.

Figure 3A:
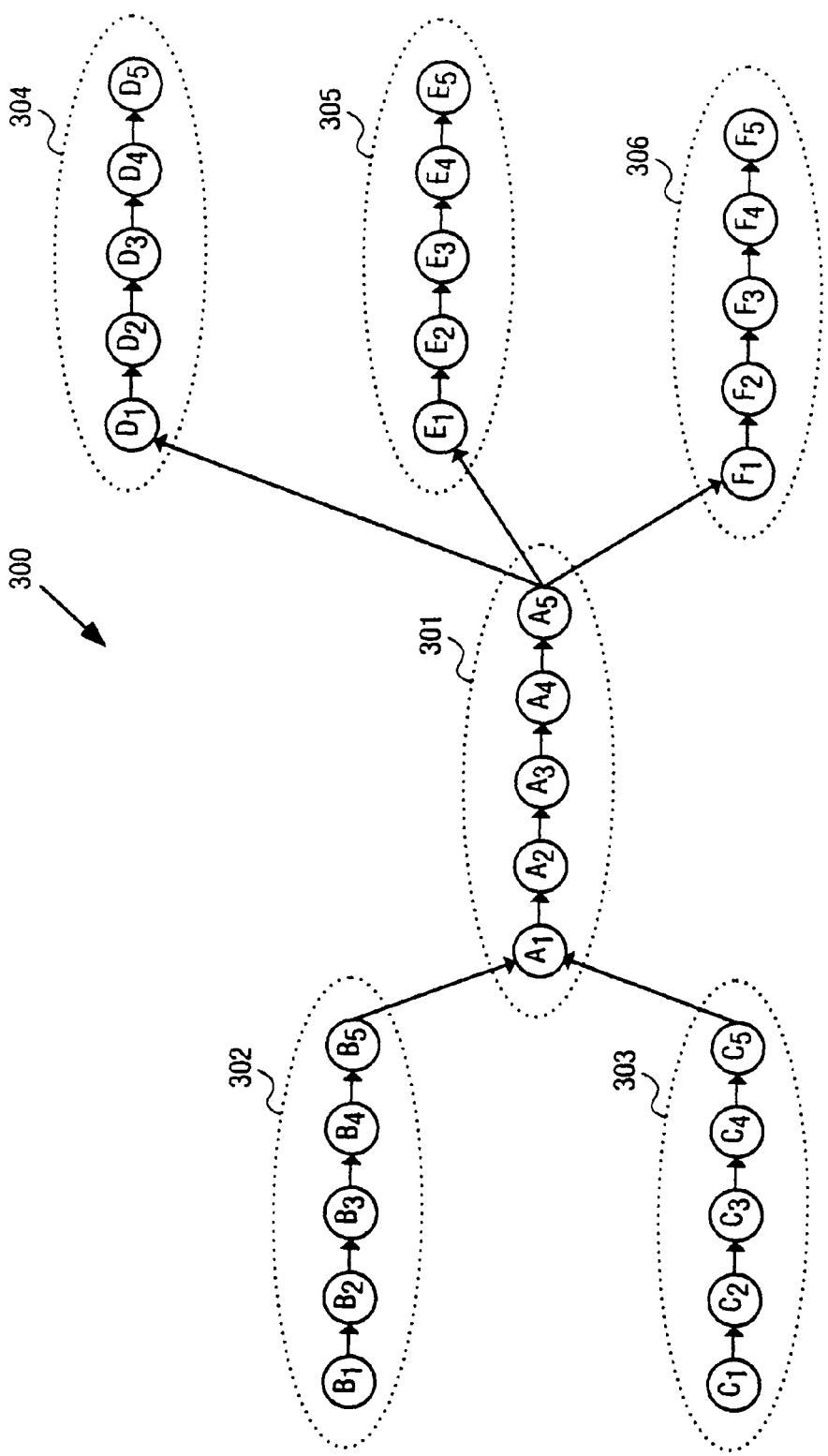
FIG. 3A is an exemplary phone graph.
Figure 3B:
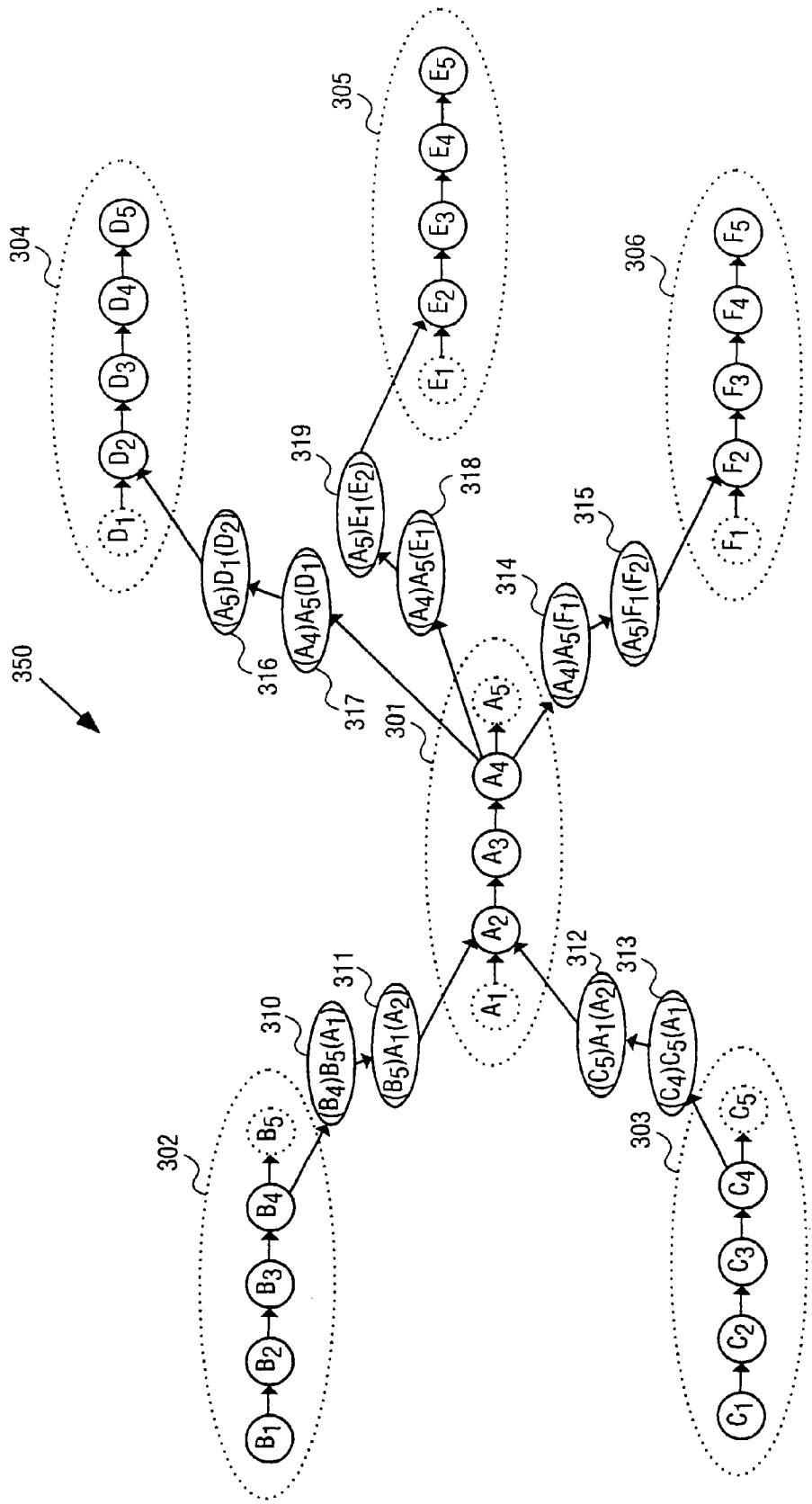
FIG. 3B is an exemplary phone graph based on a cross-word acoustical model.
Figure 3C:
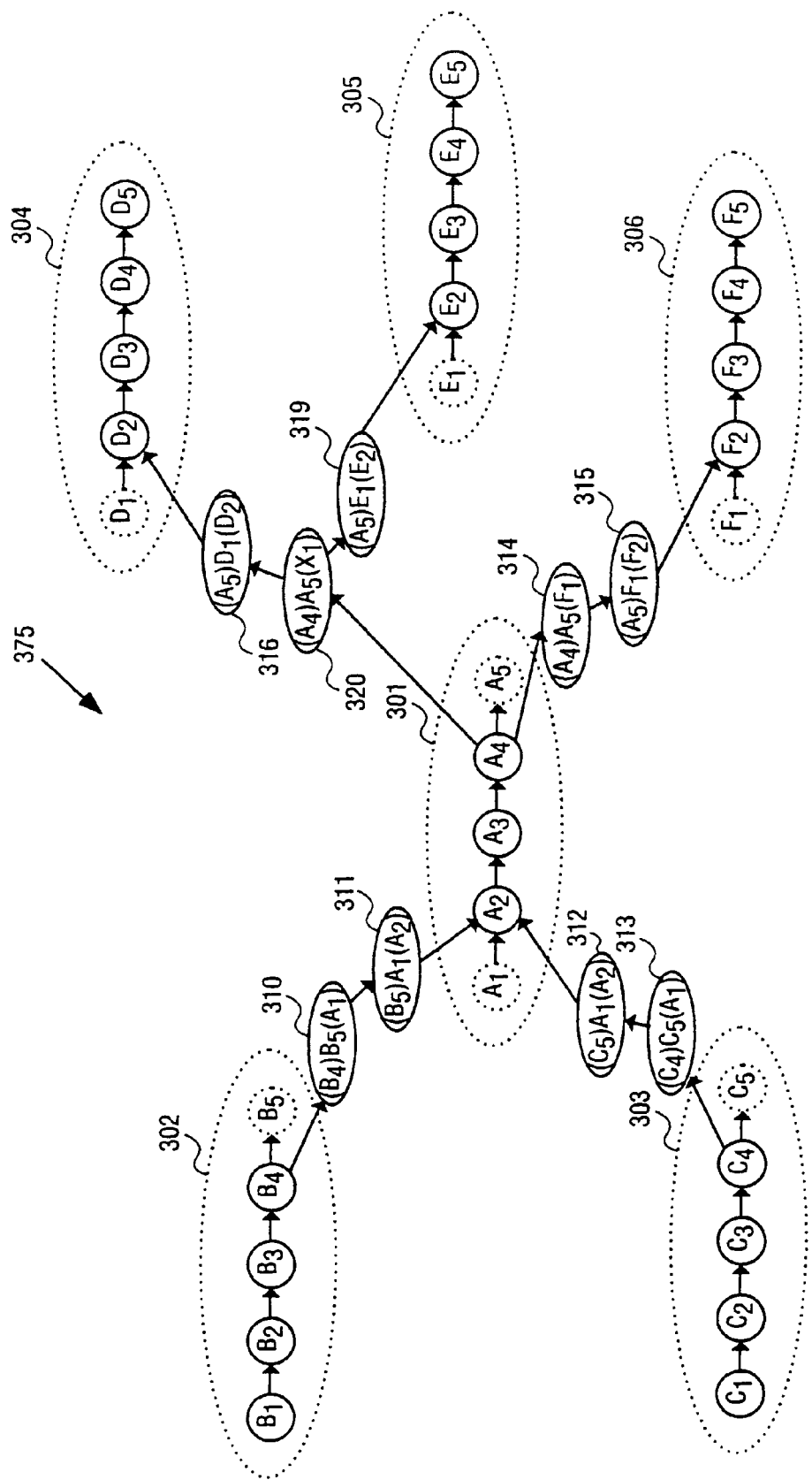
FIG. 3C is an exemplary phone graph based on a clustered cross-word acoustical model.

FIGS. 3A through 3C illustrate exemplary phone graphs used for practicing the present invention. For example, to overcome the disadvantages of using a word graph, the word graph is expanded into a phone graph such as that shown in FIG. 3A. Next, a cross-word expansion is implemented on the expanded phone graph to generate a phone graph based on a cross-word acoustical model or a clustered cross-word acoustical model such as that shown in FIG. 3B or FIG. 3C, respectively. The phone graphs as illustrated in FIGS. 3B and 3C consume less memory than the corresponding word graph and reduce greatly the decoding computation costs as will be explained below.

Figure 1A:
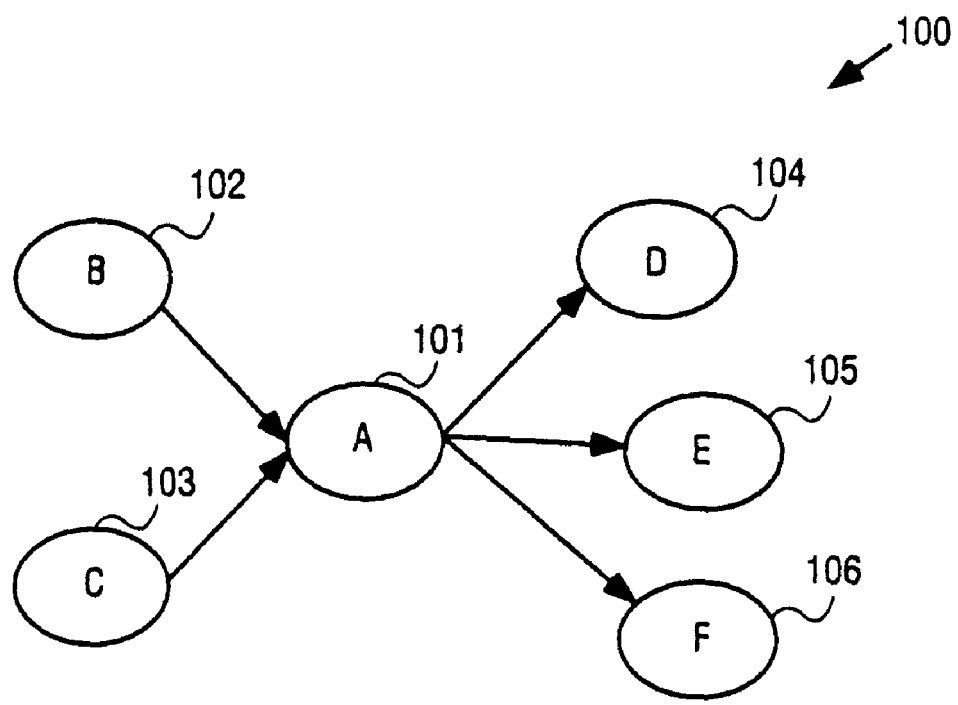
FIG. 1A is a prior art word graph based on a within word acoustical model.
Figure 1B:
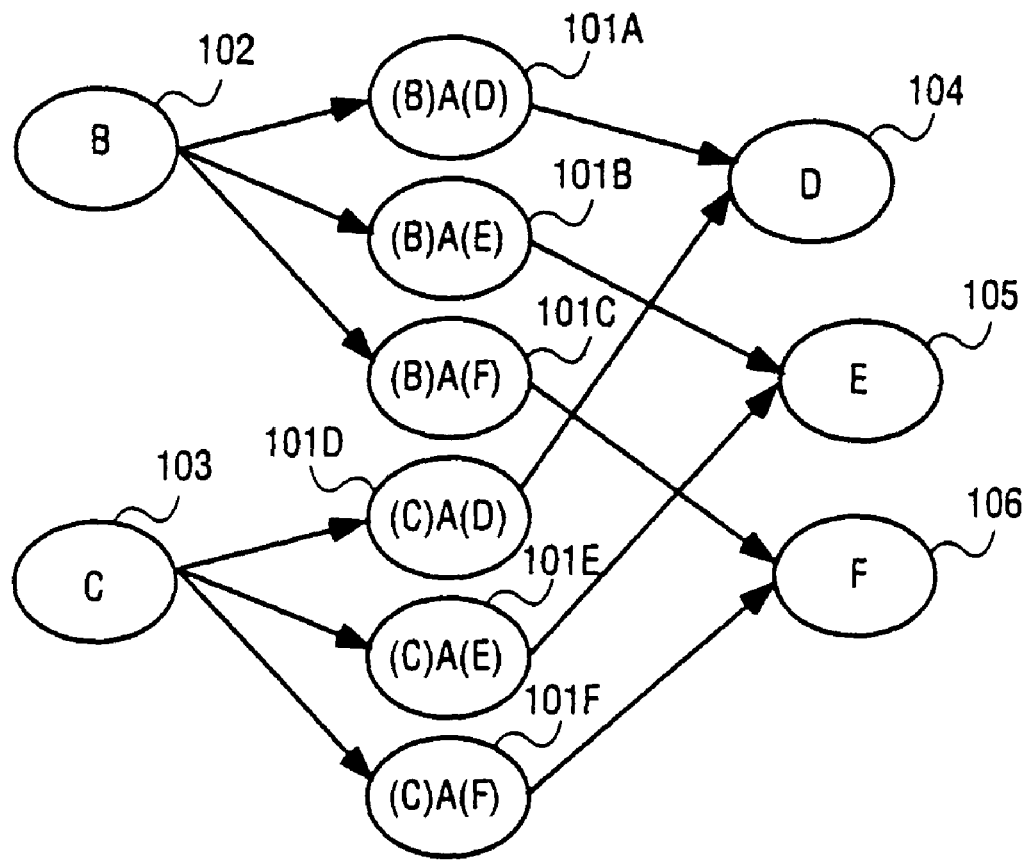
FIG. 1B is a prior art word graph based on a cross-word acoustical model.

FIG. 3A is an exemplary phone graph 300. To obtain graph 300, a word graph based on a within word model is expanded. For example, the word graph as shown in FIG. 1A can be expanded to generate phone graph 300. Referring to FIG. 3A, phone graph 300 includes a "lattice" having a plurality of phone node sets 301 ($A_1$ to $A_5$) through 306 ($F_1$ to $F_3$). For example, phone node set 301 includes a plurality of phone nodes $A_1$ to $A_5$, which represent the various types of phones comprising the word A. The word A, however, can include one or more phones. Thus, the phones in word node A are expanded into individual phone nodes $A_1$ to $A_5$.

FIG. 3B is an exemplary phone graph 350 based on a cross-word acoustical model (i.e., a model in which a word is related to a word before and after). For example, a cross-word acoustical model is implemented on phone graph 300 and expanded into phone graph 350. Referring to FIG. 3B, phone graph 350 includes a "lattice" having a plurality of phone node sets 301 ($A_2$ to $A_1$), 302 ($B_2$ to $B_1$), 303 ($C_2$ to $C_4$), 304 ($D_2$ to $D_5$), 305 ($E_2$ to $E_5$), and 306 ($F_2$ to $F_5$).

Furthermore, a new phone node set 311 (($B_5$)$A_1$($A_2$)) corresponding to word A is created. In addition, a new phone node set 310 (($B_4$)$B_5$($A_1$)) corresponding to word B is created. Three edges of the lattice [$B_4$-($B_4$)$B_5$($A_1$); ($B_4$)$B_5$($A_1$)-($B_5$)$A_1$($A_2$); and ($B_5$)$A_1$($A_2$)-$A_2$] are also created. For example, the phone nodes 310 through 319 are created. Two obsolete phone nodes $B_5$ and $A_1$ are deleted. Three obsolete edges [$B_4$-$B_5$; $B_5$-$A_1$; and $A_1$-$A_2$] are also deleted. Furthermore, necessary information in the phone node sets is transferred into phone end nodes.

New edges are created and obsolete edges are deleted for all left and right contexts of phone node sets 301 through 306 in which only 8 phone nodes or "phonemes" are copied for representing the word A. The 8 phonemes are ($B_5$)$A_1$($A_2$); ($C_5$)$A_1$($A_2$); $A_2$, $A_3$, $A_4$, ($A_4$)$A_5$($D_1$); ($A_4$)$A_5$($E_1$); and ($A_4$)$A_5$($F_1$). Thus, in contrast to the corresponding word graph in which 30 word nodes are required to represent the word A, by expanding the word graph into the phone graph, graph space and reduced computation time can be achieved.

FIG. 3C is an exemplary phone graph 375 based on a clustered cross-word acoustical model. For example, if the acoustical model is a clustered model, a plurality of phones nodes of the same cluster can be merged. That is, referring to FIG. 8 (part B) and FIG. 3C, if $(A_4)A_5(D_1)$ and $(A_4)A_5(E_1)$ are of the same cluster, these phone nodes can merge into one phone node $(A_4)A_5(X_1)$ and the two edges into one edge $[A_4-(A_4)A_5(X_1)]$. Thus, the phone graph size can be further reduced.

Figure 4:
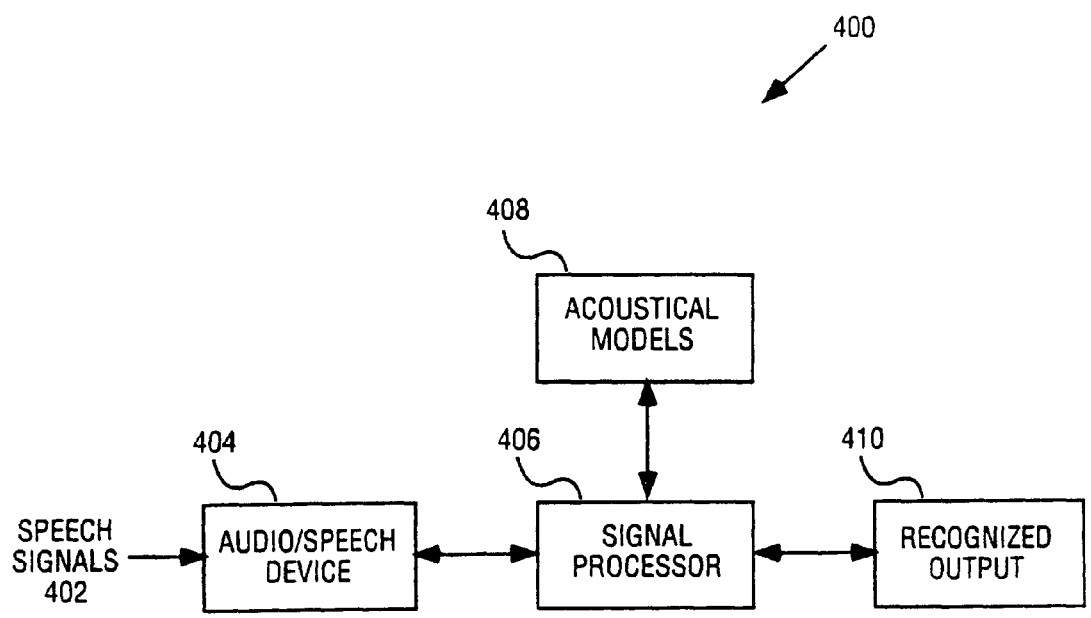
FIG. 4 is a block diagram of a speech recognition system according to one embodiment.

FIG. 4 is a block diagram of a speech recognition system 400 according to one embodiment. The speech recognition system can be implemented, e.g., in digital processing system 200 as described in FIG. 2. Referring to FIG. 4, block diagram 400 includes an audio/speech device 404 for receiving and processing speech signals 402 and a signal processor 406 for processing speech signals 402 from audio/speech device 404 using acoustical models 408 to provide a recognized output 410.

Audio/speech device 404 is an audio and speech receiving mechanism. For example, audio/speech device 404 can be a microphone. A user can speak into audio/speech device 404 in which acoustics (i.e., analog signals) are provided to audio/speech device 403. Audio/speech device 404 can convert the analog signals (i.e., speech signals 402) into digital form.

For one implementation, speech signals 402 can be used to train the speech recognition system 400 for a particular task. For example, speech signals 402 can provide words, phrases, or sentences related to weather in generating word graphs to recognize continuous speech related to the weather. For another implementation, speech signals 402 can represent unknown speech signals in which signal processor 406 processes the unknown speech signals to recognize words, phrases, or sentences.

Signal processor 406 is a processing device, which can be used during a training process or a continuous speech recognition process. During a training process, signal processor 406 can generate an acoustical model by deploying audio data from device 404 and by deploying a general acoustical model training algorithm. During a decoding process, signal processor 406 generates word graphs to maintain relationships between the words of speech signal 402 using acoustical models. For one implementation, signal processor 406 can use a within word acoustical model to build a word graph. Furthermore, to obtain a more accurate word graph, signal processor 406 can use a cross-word acoustical model to expand on the word graph based on the within word model.

The acoustical models can be based on hidden markov models (HMM). The HMM model a letter, a word, or a sentence as a series of transitions from state to state along arcs. Each arc has an associated probability, which gives the probability of the transition from one state to the next at an end of an observation frame. Thus, an unknown speech signal can be represented by ordered states with a given probability.

Also, during the training process, to overcome the disadvantages of using a word graph, signal processor 406 can also expand on the word graph based on the cross-word acoustical model to generate phone graph such as those illustrated in FIGS. 3B and 3C. The phone graphs can be used by signal processor 406 during the continuous speech recognition process to obtain a more optimum and accurate continuous speech recognition.

During a continuous speech recognition process, signal processor 406 receives unknown speech signals 402. Signal processor 406 searches the phone graph, which were generated during the training process, to match recognized words, phrases, or sentences with unknown speech signals 402. Signal processor 406 outputs recognized words, phrases, or sentences as recognized output 410. For example, signal processor 403 can output a text file as recognized output 410.

Signal processor 406 can decode the unknown speech signals 402 using slightly modified standard dynamic programming and beam searching techniques, which are adapted for phone graphs as described in FIGS. 3A to 3C. For example, special phone-end nodes will be used to record the word-end information (though no word node exists). Furthermore, the decoding process will also record the language model information if it exists. Alternatively, signal processor 406 can use known token propagation processes (using tokens to remember a path through nodes) to search a phone graph.

Figure 5:
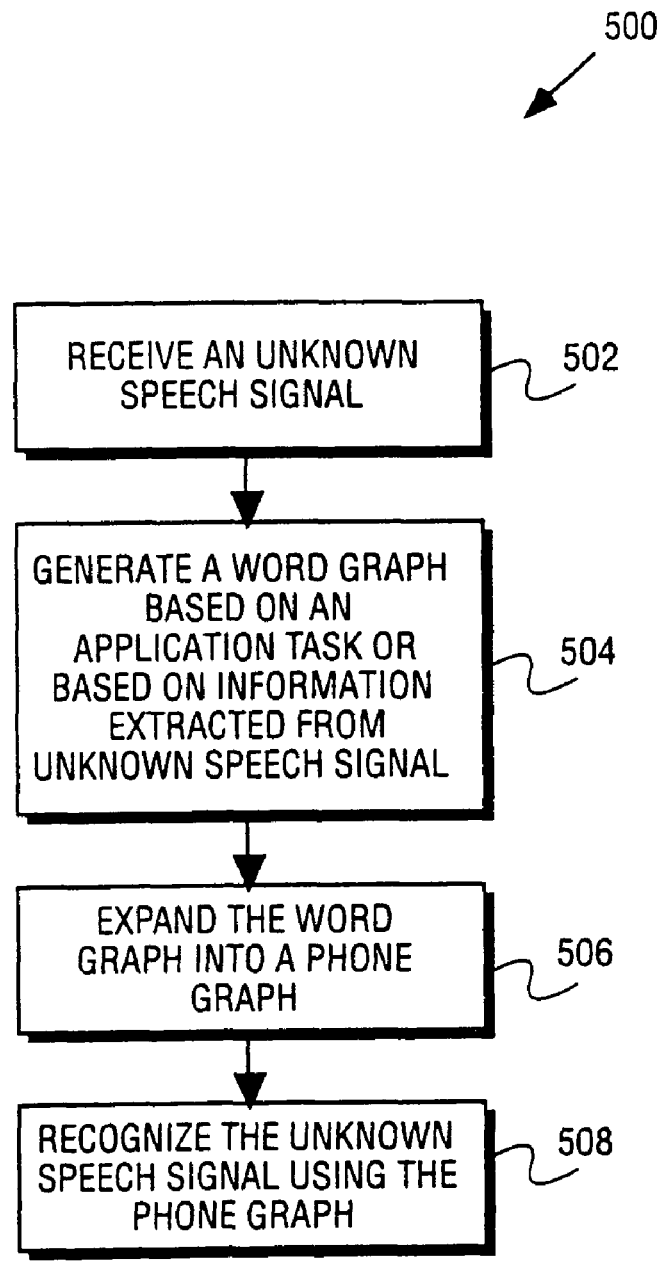
FIG. 5 is a flow chart illustrating a speech recognition operation according to one embodiment.

FIG. 5 is a flow chart illustrating a speech recognition operation 500 according to one embodiment. The system 200 as shown in FIG. 2 or the system 400 as shown in FIG. 4 can be used to perform operation 500. For purposes of explanation, operation 500 begins at operation 502.

Referring to FIG. 5, initially, at operation 502, an unknown speech signal is received (e.g., by audio/speech device 304). The unknown speech signal can be used to train the speech recognition system for a particular task or application. For example, the particular task or application may be related to reporting "weather" in which the unknown speech signals include words, phrases, or sentences related to describing the weather.

At operation 504, a word graph is generated based on a particular task or application. Alternatively, a word graph can be generated based on information extracted from the unknown speech signal. The word graph can be a within word acoustical model. Furthermore, the word graph based on the within word acoustical model can be expanded into a word graph based on a cross-word acoustical model. Thus, for purposes of explanation, the word graph is based on the cross-word acoustical model.

At operation 506, the word graph based on the cross-word acoustical model is expanded into a phone graph (e.g., a phone graph as shown in FIGS. 3B and 3C). That is, the phone graph can be based on a cross-word acoustical model or on a clustered cross-word acoustical model. The process of expanding the word graph based on the cross-word acoustical model will be explained in further detail with regards to FIG. 7.

At operation 508, the unknown speech signal is recognized based on the phone graph generated in operation 506. The unknown speech signal is used to recognize continuous speech for the particular task or application. The techniques to recognize words, phrases, or sentences using a word graph can be applied to recognizing words, phrases, or sentences using the phone graph. Thus, the phone graph is used to recognize words, phrases, or sentences in the unknown speech signal.

Figure 6:
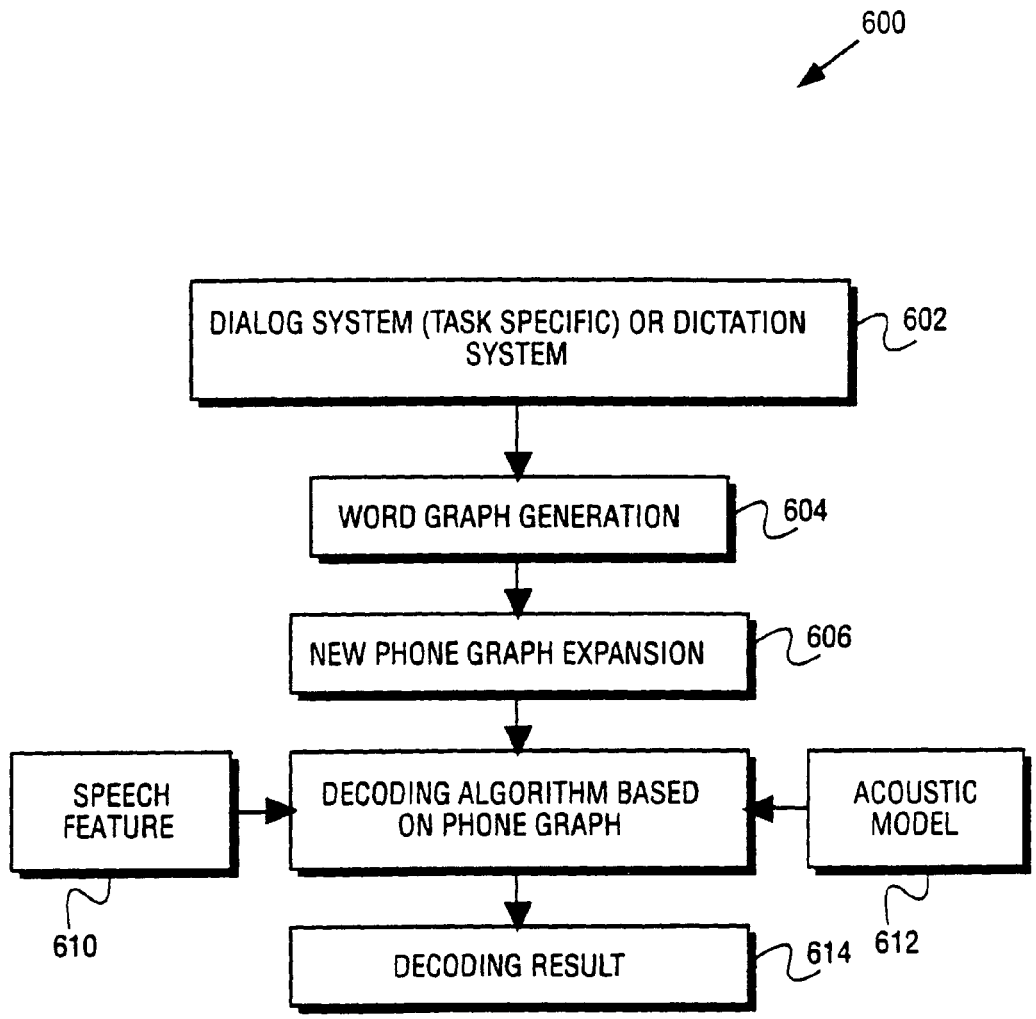
FIG. 6 is a functional flow diagram illustrating a speech recognition process according to one embodiment.

FIG. 6 is a functional flow diagram illustrating a speech recognition process 600 according to one embodiment. The system 200 as shown in FIG. 2 or the system 400 as shown in FIG. 4 can be used to perform process 600. For purposes of explanation, process 600 begins a functional block 602.

Referring to FIG. 6, initially, at functional blocks 602 and 604, a word graph is generated by a dialog system. A dialog system generates a word graph for specific types of speech, e.g., speech related to a weather report, a ticket order, and etc. Generally, the dialog system generates the word graph using finite state grammar (FSG) compiler by signal processor 203. The FSG can be written by the user according to the application (such as a weather report, plane ticket inquire, etc.) or other like task requirement. The signal processor 203 can then generate the word graph by compiling the FSG into a word graph format.

Alternatively, a word graph can be generated by a dictation system. A dictation system generates a word graph in terms of the unknown speech signal, that is, the word graph represents a middle recognition result by the dictation system based on the unknown speech signal. The dialog system or dictation system can generate a word graph based on either a within word acoustical model or a cross-word acoustical model.

At functional block 606, the word graph (preferably a word graph based on a cross-word acoustical model) is expanded into a phone graph. The word graph is expanded into the phone graph by using the techniques, which will be described with respect to FIG. 7 below.

For example, signal processor 203 can be used to expand the word graph into a phone graph. That is, a word node of a word graph is expanded into a plurality of phone nodes, i.e., a first phone graph. Next, a cross-word expansion operation is performed on the first phone graph to generate a second phone graph. The second phone graph contains copies of only needed phone nodes as opposed to making multiple copies of a word node.

At functional blocks 610 and 612, a speech feature and an acoustical model can be provided to a signal processor 203 to decode an unknown speech signal. At function block 608, the signal processor 203 decodes the unknown speech signal using the new phone graph and/or the speech feature and acoustic model. The signal processor 203 can use a decoding process such as that described for signal processor 406 in FIG. 4.

At function block 614, signal processor 203 outputs a decoding result. The decoding result provides recognized output such as a text file. The text file can be stored in a memory or further processed for other applications.

Figure 7:
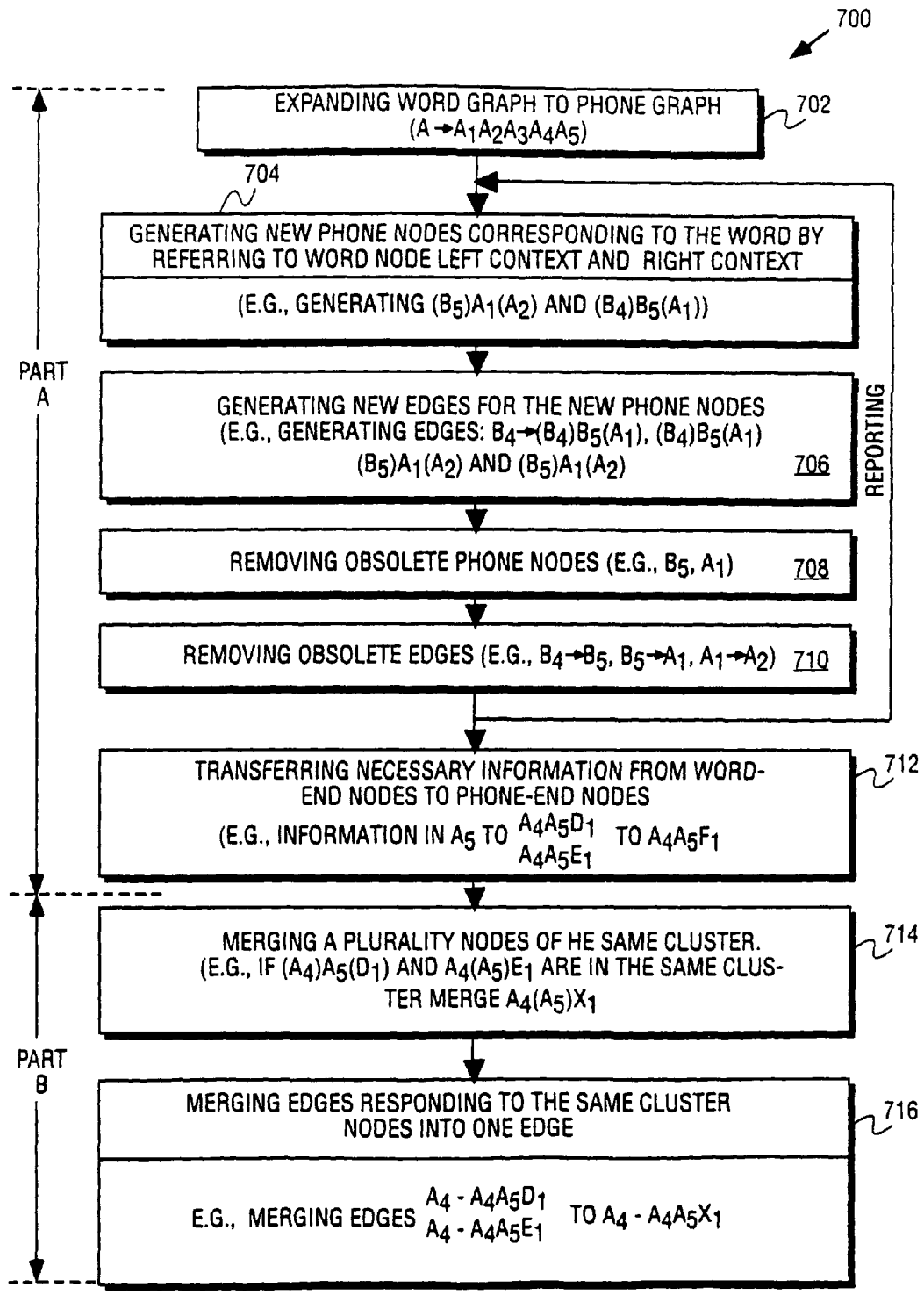
FIG. 7 is a flow chart illustrating an exemplary operation to expand a word graph to a phone graph.

FIG. 7 is a flow chart illustrating an exemplary operation 700 to expand a word graph to a phone graph. The system 200 as shown in FIG. 2 or the system 400 as shown in FIG. 4 can be used to perform process 700. The operation 700 is depicted in two parts, which are Part A (operations 702 to 710) and Part B (operations 712 to 716).

Part A of operation 700 relates to expanding a phone graph based on a cross-word acoustical model. Part B of operation 700 relates to merging a plurality of nodes of the same cluster for the phone graph generated in Part A. For purposes of explanation, process 700 begins at operation 702.

Referring to FIG. 7, at operation 702, a word graph is expanded into a phone graph such as that shown, e.g., in FIG. 3A. For example, a word A having, e.g., 5 phones, is expanded into 5 phone nodes (word A→phone nodes—$A_1, A_2, A_3, A_4, A_5$).

At operation 704, the phone graph generated in operation 702 is expanded based on a cross-word acoustical model such as that shown, e.g., in FIG. 3B. The phone graph is expanded by generating new phone nodes with reference to each word's left context and right context (e.g. generating $(B_5)A_1(A_2)$ and $(B_4)B_5(A_1)$).

At block 706, new edges are generated for the new phone nodes (e.g., generating edges: $B_4$-$(B_4)B_5(A_1)$, $(B_4)B_5(A_1)$-$(B_5)A_1(A_2)$ and $(B_5)A_1(A_2)$-$A_2$. For example, using edge $B_5 \rightarrow A_1$ as an example (that is, from phone node $B_5$ to $A_1$), cross-word phone node for $B_5$ and $A_1$, respectively, is duplicated according a cross-word acoustical model. For the new phone corresponding to $B_5$, it is labeled as "$(B_4)B_5(A_1)$". For the new phone node corresponding to $A_1$, it is labeled as $(B_5)A_1(A_2)$. Three new edges are also generated, which connect $B_4$, $(B_4)B_5(A_1)$, $(B_5)A_1(A_2)$, $A_2$, respectively.

At operations 708 and 710, obsolete phone nodes and corresponding obsolete edges are removed. For example, phone nodes $B_5$ and $A_1$ are removed and edges $B_4 \rightarrow B_5$, $B_5 \rightarrow A_1$, $\rightarrow A \rightarrow A_2$ are removed. The operations for Part A are repeated for all word nodes (i.e., unit words) of the word graph are completed.

At block 712, necessary information from word-end nodes are transferred to phone-end nodes. For example, $(A_4)A_5$ $(D_1)$, $(A_4)A_5(E_1)$, $(A_4)A_5(F_1)$ are phone-end nodes are transferred (e.g., information in A5 is transferred to $(A_4)A_5(D_1)$, $(A_4)A_5(E_1)$, $(A_4)A_5(F_1)$).

The thusly-generated phone graph reduces the graph size of its corresponding word graph, which required copying multiple copies of a word node. Here, necessary phone nodes are copied thereby reducing system memory use and decoding computation cost.

The following operations 714 and 716 related to Part B are optional. That is, if the acoustical model is a clustered mode, the net size can be further compressed effectively based on the clustering rules. If the edge number starting from one word node is large, a higher compression rate will be obtained.

At operation 714, a plurality nodes of the same cluster are merged (e.g., if $(A_4)A_5(D_1)$ and $A_4(A_5)E_1$ are in the same cluster merge the cluster into $A_4(A_5)X_1$ as shown in FIG. 3C).

At operation 716, edges of the same cluster node are merged into one edge (e.g., merging $$A_4 - A_4A_5D_1$$

$$A_4 - A_4A_5E_1$$

to $A_4$-$A_4A_5X_1$). By the following operations 714 and 716, the phone graph can be further reduced.

The thusly-generated phone graph reduces further the graph size of its corresponding word graph, which required copying multiple copies of a word node. Thus, the expanded phone graph of Part B provides further improvements to recognizing continuous speech.

Thus, a method and system for expanding a word graph to a phone graph based on a cross-word acoustical model to improve continuous speech recognition have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A speech recognition method, comprising:
    generating a word graph based on an application task or based on information extracted from an unknown speech signal;
    expanding the word graph into a phone graph;
    receiving a second unknown speech signal;
    searching the phone graph for a word in the second unknown speech signal; and
    outputting a word in the second unknown speech signal for which a match is found in searching the phone graph.

2. The method of claim 1, wherein expanding the word graph into a phone graph includes expanding the phone graph into a second phone graph based on a cross-word acoustical model, wherein the second phone graph contains only needed phone nodes.

3. The method of claim 1, wherein expanding the word graph includes:
    expanding each word node of the word graph into a plurality of phone nodes for the phone graph; and
    removing unnecessary phone nodes from the phone graph.

4. The method of claim 1, wherein searching the phone graph for a word in the second unknown speech signal includes searching the phone graph for known words, phrases, or sentences in the second unknown speech signal.

5. A speech recognition system comprising:
- an input to receive an unknown speech signal for use in generating a word graph, and to receive a second unknown speech signal;
- a processor to generate the word graph based on an application task or based on information extracted from the unknown speech signal, to expand the word graph into a phone graph, and to search the phone graph for a word in the second unknown speech signal; and
- an output to provide a word in the second unknown speech signal for which a match is found in the search of the phone graph.

6. The system of claim 5, wherein the processor is to expand the phone graph into a second phone graph based on a cross-word acoustical model.

7. The system of claim 5, wherein the processor is to expand each word node of the word graph into a plurality of phone nodes for the phone graph and to remove unnecessary phone nodes from the phone graph.

8. The system of claim 5, wherein the processor is to search the phone graph for known words, phrases, or sentences in the second unknown speech signal.

9. A non-transitory machine-readable medium that provides instructions, which if executed by a processor, cause the processor to perform the operations comprising:
- generating a word graph based on an application task or based on information extracted from an unknown speech signal;
- expanding the word graph into a phone graph;
- receiving a second unknown speech signal;
- searching the phone graph for a word in the second unknown speech signal; and
- outputting a word in the second unknown speech signal for which a match is found in searching the phone graph.

10. The non-transitory machine-readable medium of claim 9, further providing instructions, which if executed by a processor, cause the processor to perform the operations of:
- expanding the phone graph into a second phone graph based on a cross-word acoustical model.

11. The non-transitory machine-readable medium of claim 9, further providing instructions, which if executed by a processor, cause the processor to perform the operations of:
- expanding each word node of the word graph into a plurality of phone nodes for the phone graph; and
- removing unnecessary phone nodes from the phone graph.

12. The non-transitory machine-readable medium of claim 9, further providing instructions, which if executed by a processor, cause the processor to perform the operations of:
- searching the phone graph for known words, phrases, or sentences in the second unknown speech signal using the phone graph.

13. A speech processing method comprising:
- expanding a word graph into a first phone graph based on a within word acoustical model;
- generating a second phone graph using the first phone graph based on a crossword acoustical model;
- generating new edges for the second phone graph;
- removing obsolete phone nodes and edges from the second phone graph; and
- transferring necessary information from word end nodes to phone end nodes in the second phone graph.

14. The speech processing method of claim 13, further comprising:
- merging a plurality of nodes of a same cluster in the second phone graph; and
- merging edges relating to the same cluster into one edge.

15. The speech processing method of claim 13, wherein the expanding the word graph into the first phone graph includes expanding the word graph into the first phone graph for all word nodes within the word graph.

16. A non-transitory machine-readable medium that provides instructions, which if executed by a processor, cause the processor to perform operations comprising:
- expanding a word graph into a first phone graph based on a within word acoustical model;
- generating a second phone graph using the first phone graph based on a crossword acoustical model;
- generating new edges for the second phone graph;
- removing obsolete phone nodes and edges from the second phone graph; and
- transferring necessary information from word end nodes to phone end nodes in the second phone graph.

17. The non-transitory machine-readable medium of claim 16, further comprising instructions, which if executed by a process, cause the processor to perform the operations of:
- merging a plurality of nodes of a same duster in the second phone graph; and
- merging edges relating to the same cluster into one edge.

18. The non-transitory machine-readable medium of claim 16, further comprising instructions, which if executed by a process, cause the processor to perform the operations of:
- expanding the word graph into the first phone graph for all word nodes within the word graph.

* * * * *